US008060901B2

(12) United States Patent
Tsuchiya

(10) Patent No.: US 8,060,901 B2
(45) Date of Patent: Nov. 15, 2011

(54) INFORMATION PROVIDING METHOD AND INFORMATION PROVIDING SYSTEM

(75) Inventor: Atsushi Tsuchiya, Tokyo (JP)

(73) Assignee: Sony Corporation (JP)

( * ) Notice: Subject to any disclaimer, the term of this patent is extended or adjusted under 35 U.S.C. 154(b) by 380 days.

(21) Appl. No.: 11/731,291

(22) Filed: Mar. 30, 2007

(65) Prior Publication Data

US 2007/0180475 A1 Aug. 2, 2007

Related U.S. Application Data

(62) Division of application No. 10/305,898, filed on Nov. 27, 2002, now abandoned.

(30) Foreign Application Priority Data

Nov. 29, 2001 (JP) ................................ P2001-365396

(51) Int. Cl.
*H04N 7/16* (2011.01)
*G06F 17/00* (2006.01)

(52) U.S. Cl. ................................ 725/8; 725/14; 700/94

(58) Field of Classification Search .................... 700/94; 725/38, 86, 8, 9, 14, 15, 16, 17, 18, 19, 20
See application file for complete search history.

(56) References Cited

U.S. PATENT DOCUMENTS 5,367,329 A 11/1994 Nakagaki et al.
5,740,075 A * 4/1998 Bigham et al. ................ 709/229
5,752,160 A * 5/1998 Dunn ............................. 725/93
5,801,747 A * 9/1998 Bedard ........................... 725/46
6,434,746 B1 * 8/2002 Nagashima et al. .............. 725/5
6,804,825 B1 * 10/2004 White et al. .................... 725/87
6,986,156 B1 1/2006 Rodriguez et al.
2002/0059621 A1 5/2002 Thomas et al.
2002/0144275 A1 10/2002 Kay et al.
2002/0161713 A1 10/2002 Oh
2002/0174430 A1 11/2002 Ellis et al.
2005/0144641 A1 6/2005 Lewis

FOREIGN PATENT DOCUMENTS

JP 05-323984 12/1993
JP 07-250316 9/1995
JP 09-046679 2/1997
JP 09-198070 7/1997
JP 10-333769 12/1998
JP 2000-101574 4/2000
JP 2000-285660 10/2000
JP 2001-125914 5/2001
JP 2001-136505 5/2001
JP 2001-268535 9/2001
JP 2001-297093 10/2001
JP 2001-318949 11/2001

* cited by examiner

*Primary Examiner* — Kristine Kincaid
*Assistant Examiner* — John Schnurr
(74) *Attorney, Agent, or Firm* — Lerner, David, Littenberg, Krumholz & Mentlik, LLP

(57) ABSTRACT

A terminal can play back song or video information in real time without downloading it, and thus restrictions on the hardware of the terminal are reduced and a large amount of music can be listened to anytime and anywhere. Also, the user can listen to music more cheaply than if it was downloaded, and copyright problems are reduced. Further, the terminal is charged based on the playback time or the amount of information. Accordingly, when the user stops playback because he or she does not like a song, the price is less than it is when the user listens to the song to the end, and thus the user can feel free to use this service.

4 Claims, 12 Drawing Sheets

TERMINAL SIDE
SERVER SIDE
START
ST101 TRANSMIT AUTHENTICATION INFORMATION
DISPLAY ERROR MESSAGE
ERROR
AUTHENTICATION ST102
OK
ST104 SELECT FROM MENU
TRANSMIT MENU ST103
ST105 SPECIFY SONG
TRANSMIT SONG ST106
ST107 LISTEN TO SONG
ST108 STOP PLAYBACK WITHIN SHORT TIME
YES
CHARGE FREE
NO
ST109 STOP PLAYBACK AT SOME MID-POINT
YES
CHARGE ACCORDING TO PLAYBACK TIME
NO
ST110 END OF PLAYBACK
FULL CHARGE
END

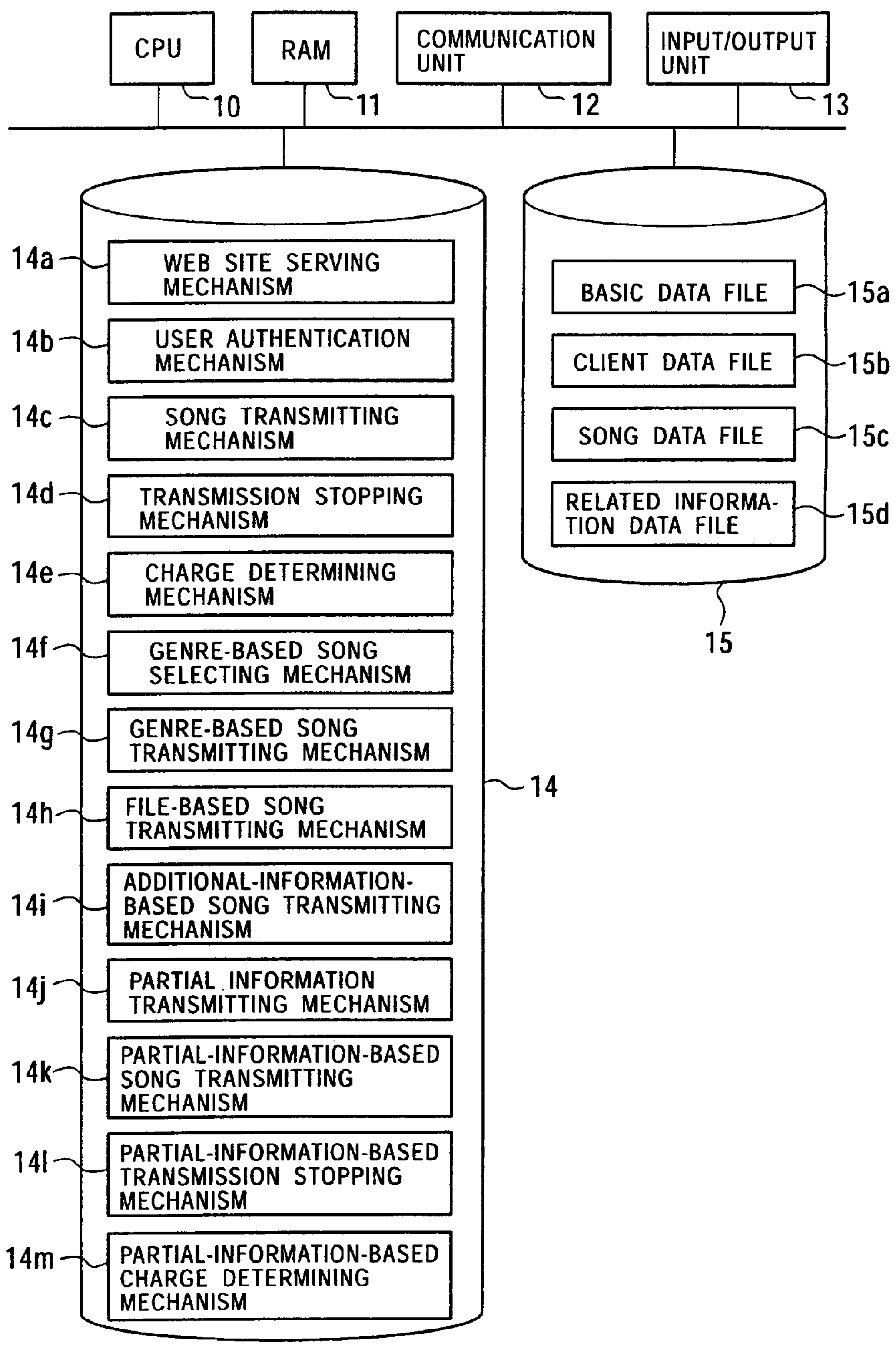
FIG. 3
CPU
RAM
COMMUNICATION UNIT
INPUT/OUTPUT UNIT
10
11
12
13
14a
WEB SITE SERVING MECHANISM
14b
USER AUTHENTICATION MECHANISM
14c
SONG TRANSMITTING MECHANISM
14d
TRANSMISSION STOPPING MECHANISM
14e
CHARGE DETERMINING MECHANISM
14f
GENRE-BASED SONG SELECTING MECHANISM
14g
GENRE-BASED SONG TRANSMITTING MECHANISM
14h
FILE-BASED SONG TRANSMITTING MECHANISM
14i
ADDITIONAL-INFORMATION-BASED SONG TRANSMITTING MECHANISM
14j
PARTIAL INFORMATION TRANSMITTING MECHANISM
14k
PARTIAL-INFORMATION-BASED SONG TRANSMITTING MECHANISM
14l
PARTIAL-INFORMATION-BASED TRANSMISSION STOPPING MECHANISM
14m
PARTIAL-INFORMATION-BASED CHARGE DETERMINING MECHANISM
14
BASIC DATA FILE
15a
CLIENT DATA FILE
15b
SONG DATA FILE
15c
RELATED INFORMATION DATA FILE
15d
15

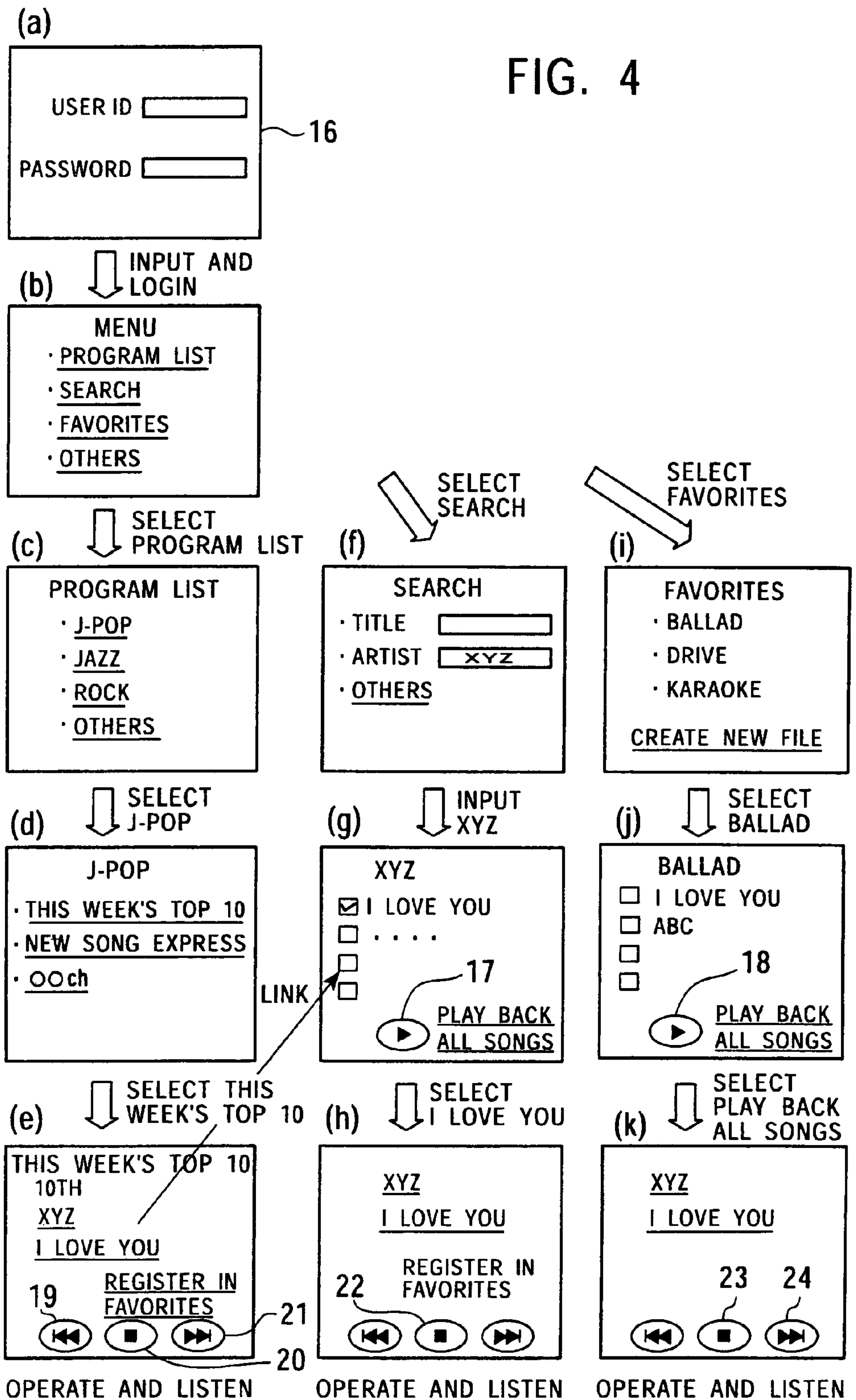
FIG. 4
(a)
USER ID
PASSWORD
16
INPUT AND LOGIN
(b)
MENU
· PROGRAM LIST
· SEARCH
· FAVORITES
· OTHERS
SELECT PROGRAM LIST
(c)
PROGRAM LIST
· J-POP
· JAZZ
· ROCK
· OTHERS
SELECT J-POP
(d)
J-POP
· THIS WEEK'S TOP 10
· NEW SONG EXPRESS
· OOch
LINK
SELECT THIS WEEK'S TOP 10
(e)
THIS WEEK'S TOP 10
10TH
XYZ
I LOVE YOU
19
REGISTER IN FAVORITES
21
20
OPERATE AND LISTEN
SELECT SEARCH
(f)
SEARCH
· TITLE
· ARTIST XYZ
· OTHERS
INPUT XYZ
(g)
XYZ
I LOVE YOU
· · · ·
17
PLAY BACK ALL SONGS
SELECT I LOVE YOU
(h)
XYZ
I LOVE YOU
REGISTER IN FAVORITES
22
OPERATE AND LISTEN
SELECT FAVORITES
(i)
FAVORITES
· BALLAD
· DRIVE
· KARAOKE
CREATE NEW FILE
SELECT BALLAD
(j)
BALLAD
I LOVE YOU
ABC
18
PLAY BACK ALL SONGS
SELECT PLAY BACK ALL SONGS
(k)
XYZ
I LOVE YOU
23
24
OPERATE AND LISTEN

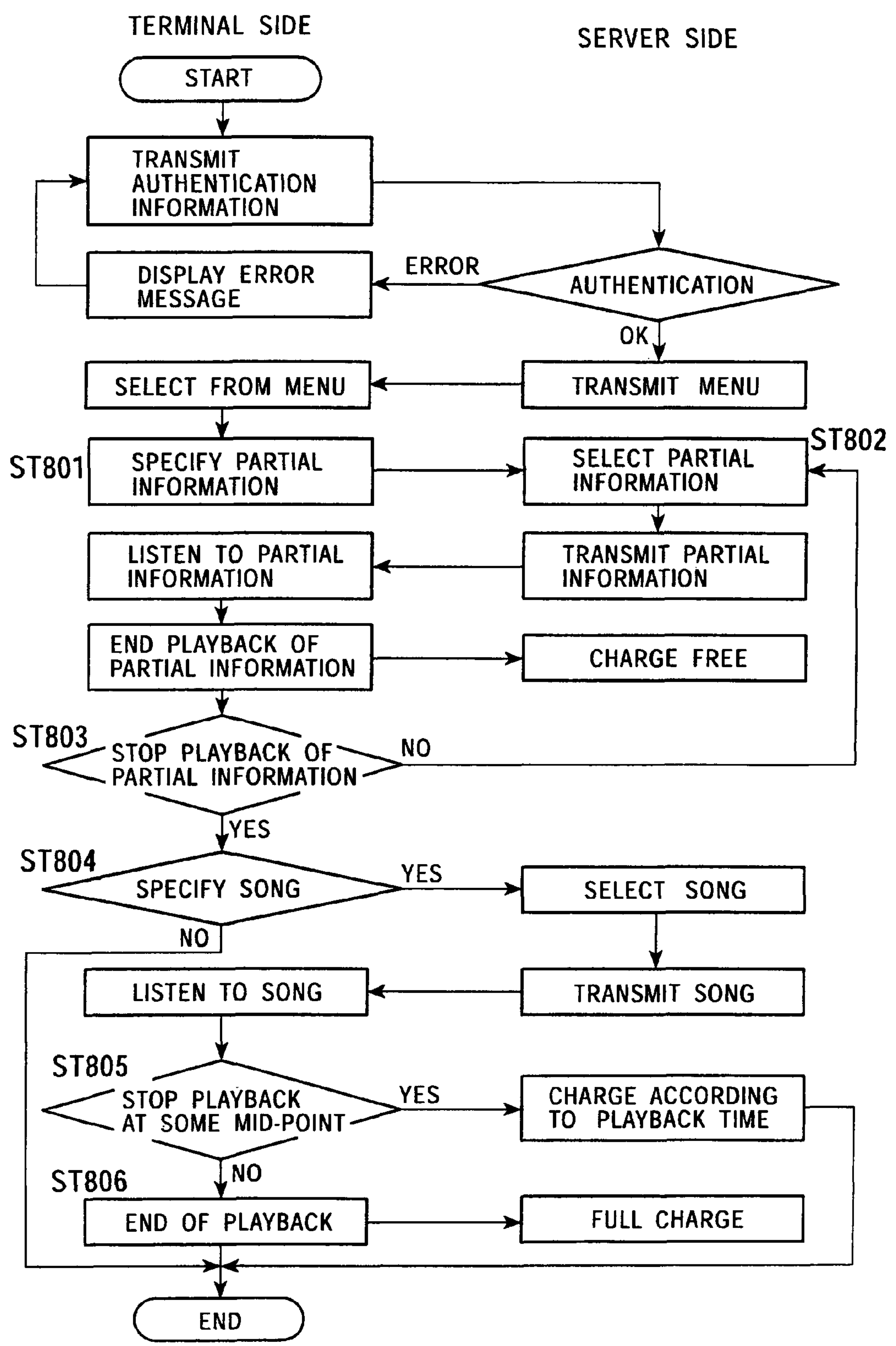
FIG. 12
TERMINAL SIDE
SERVER SIDE
START
TRANSMIT AUTHENTICATION INFORMATION
DISPLAY ERROR MESSAGE
ERROR
AUTHENTICATION
OK
SELECT FROM MENU
TRANSMIT MENU
ST801
SPECIFY PARTIAL INFORMATION
SELECT PARTIAL INFORMATION
ST802
LISTEN TO PARTIAL INFORMATION
TRANSMIT PARTIAL INFORMATION
END PLAYBACK OF PARTIAL INFORMATION
CHARGE FREE
ST803
STOP PLAYBACK OF PARTIAL INFORMATION
NO
YES
ST804
SPECIFY SONG
YES
SELECT SONG
NO
LISTEN TO SONG
TRANSMIT SONG
ST805
STOP PLAYBACK AT SOME MID-POINT
YES
CHARGE ACCORDING TO PLAYBACK TIME
ST806
NO
END OF PLAYBACK
FULL CHARGE
END

INFORMATION PROVIDING METHOD AND INFORMATION PROVIDING SYSTEM

CROSS-REFERENCE TO RELATED APPLICATIONS

This application is a divisional of U.S. application Ser. No. 10/305,898, filed on Nov. 27, 2002, the disclosure of which is incorporated herein by reference which claims priority from Japanese Application No. 2001-365396 filed Nov. 29, 2001, the disclosure of which is hereby incorporated by reference herein.

BACKGROUND OF THE INVENTION

The present invention relates to an information providing method and an information providing system for providing music or video information, for example, through the Internet.

With the development of an Internet-related technique, music information and so on has been provided to users through the Internet by using various methods. Among them, the following are two main methods:

1. Charge-free and short-time audition or playback of music as a promotion
2. Paid distribution by downloading Users can obtain music information by, for example, paid distribution by downloading, and do not need to go to a store. Therefore, increased convenience can be realized.

In the charge-free and short-time audition, however, users can listen to music only for a short time and they cannot always listen to a desired song. Also, in the playback as a promotion, users cannot always listen to a desired song, as in the short-time audition.

On the other hand, in the paid distribution by downloading, more songs are provided than in a short-time audition and a promotion, and a desired song is more likely to be provided. However, this service is expensive and users may have second thoughts.

In such a situation, the Internet cannot be used adequately and copyright holders of music cannot obtain sufficient income.

SUMMARY OF THE INVENTION

The present invention has been made in view of the above-described situation, and it is an object of the present invention to provide a method and a system in which music or video information can be provided to users more cheaply and conveniently through a network and more profit can be distributed to copyright holders.

In order to achieve the above-described object, according to a first aspect of the present invention, a method for providing music or video information from a server to a terminal through a network is provided. The method includes transmitting the information from the server to the terminal; playing back the transmitted information in real time in the terminal; stopping transmission of the information from the server to the terminal when the terminal outputs a playback stop instruction while the information is being played back; and determining a charge to the terminal for the transmitted information based on a factor selected from the group consisting of an amount of the transmitted information and an amount of time the transmitted information was played back.

In the present invention, since music or video information can be played back in real time in the terminal without downloading it, restrictions on the hardware of the terminal are reduced and a large amount of music can be listened to anytime and anywhere. Also, copyright problems can be reduced.

Also, the charge to the terminal is determined based on the playback time or the amount of information. Thus, when the user stops playback because he or she does not like the song, the price is lower than the case where the user listens to the song to the end, and thus the user can feel free to use this service.

Further, in the known art of charge free or pay downloading, copyright holders cannot obtain sufficient income. However, by introducing a charging method based on the playback time, increased income can be expected.

Preferably, when all the information in a unit of information has been transmitted to the terminal or played back in the terminal, the charge to the terminal is less than (i) the charge to the terminal when all the information in the unit of information has been downloaded to the terminal, and (ii) the cost of purchasing a medium recorded with the unit of information. Accordingly, the user can listen to a song to the end at a lower cost, and also the user can evaluate a song, which cannot be performed in a short-time audition, at a lower cost than the case where the song is downloaded or the case where the user buys a recording medium recorded with the information.

Also, the user can enjoy listening to music at ease, feeling as if he or she has rented a song instead of buying it. Further, copyright holders can obtain new income.

Preferably, the terminal is not charged when the playback time or the amount of transmitted information does not reach a predetermined level. With this arrangement, the user is not charged when he or she stops playback after listening to a song for about 10 seconds. Therefore, the user is not charged when he or she listens to a non-favorite song, and thus the user can feel free to try an unknown song. Also, when the user likes a song after listening to the beginning of the song, he or she need not perform a further operation to listen to the song to the end, which is convenient.

The method may further include specifying in the terminal a genre or an artist of the information; and transmitting from the server to the terminal at least one piece of information corresponding to the specified genre or artist. Accordingly, the user can specify his or her favorite genre, for example, the top 100, instead of a song itself, and thus the user can listen to a currently popular song. In this case, the user is charged based on the playback time, and thus the user can feel free to try a song.

The method may further include evaluating a preference of a user of the terminal for the information in advance in the server; selecting in the server a plurality of pieces of information according to the preference of the user; and transmitting at least one of the plurality of pieces of information from the server to the terminal as the at least one piece of information corresponding to the specified genre or artist. With this arrangement, the server can store the user's preference so as to select many of the user's favorite songs at the time of genre playback. Accordingly, the number of operations required by the user, such as skipping songs, can be reduced and the royalties for the information providing program can be increased.

The method may further include requesting, from the terminal to the server, information in units of files so as to specify at least one piece of information; and transmitting the information in the units of files from the server to the terminal in response to the request. With this arrangement, if the user registers a song in a favorites file, he or she can play back all of the songs in the favorites file simply by specifying the file. Further, a specific favorite song can be played back by specifying the song in the file. Accordingly, the user need not input or search for a song, and thus the operation by the user can be simplified.

Further, continuous playback and shuffle playback can be performed in the file, and songs can be sorted out or classified when the number of songs in the file increases.

Preferably, predetermined information related to the information is added to the information in the server so that the information is transmitted from the server to the terminal together with the predetermined information. Accordingly, the latest information about the song can be provided while the song is being played back, and thus convenience for the user is enhanced and sales promotion can be performed.

According to a second aspect of the present invention, a method for providing music or video information from a server to a terminal through a network is provided. The method includes sequentially transmitting from the server to the terminal pieces of specific partial information selected in advance from a plurality of pieces of information; playing back the transmitted pieces of specific partial information in real time in the terminal; selecting in the terminal a desired piece of information from the plurality of pieces of information based on the played back pieces of specific partial information; and transmitting the selected piece of information from the server to the terminal. In the present invention, pieces of specific partial information of music or video information are sequentially transmitted. Thus, by selecting a climax part of a song as well as the beginning of the song, the user can select a favorite song referring to the sequentially transmitted pieces of specific information so as to register the favorite song in his or her favorites file. Accordingly, the user can select and play back a song rapidly the next time, which leads to a significant increase in the user's convenience.

The method may further include providing the pieces of specific partial information from the server to the terminal free of charge; playing back the selected piece of information in real time in the terminal; stopping transmission of the selected piece of information from the server to the terminal when the terminal outputs a playback stop instruction while the selected piece of information is being played back; and determining a charge to the terminal for the selected piece of information based on a factor selected from the group consisting of an amount of the selected piece of information transmitted and an amount of time the selected piece of information was played back. Accordingly, the user can sequentially listen to, for example, the climax of songs without worrying about the charge. When the user likes a song, he or she can register the song immediately in his or her file.

According to a third aspect of the present invention, a system for providing music or video information is provided. The system includes a server; a terminal; and a network operable to carry information between the server and the terminal. The terminal includes a unit for playing back in real time information transmitted from the server; and a unit for communicating a playback stop instruction to the server while the information is being played back. The server includes a unit for transmitting the information to the terminal; a unit for stopping transmission of the information to the terminal when the terminal communicates the playback stop instruction to the server; and a charge determining unit operable to determine a charge to the terminal for the transmitted information based on a factor selected from the group consisting of an amount of the transmitted information and an amount of time the transmitted information was played back.

In the present invention, since music or video information can be played back in real time in the terminal without downloading it, restrictions on the hardware of the terminal are reduced and a large amount of music can be listened to anytime and anywhere. Also, copyright problems can be reduced.

Also, the charge to the terminal is determined based on the playback time or the amount of information. Thus, when the user stops playback because he or she does not like the song, the price is lower than the case where the user listens to the song to the end, and thus the user can feel free to use this service.

Further, in the known art of charge free or pay downloading, copyright holders cannot obtain sufficient income. However, by introducing a charging method based on the playback time, increased income can be expected.

Preferably, the charge determining unit determines the charge to the terminal when all the information in a unit of information has been transmitted to the terminal or played back in the terminal, the charge being less than (i) the charge to the terminal when all the information in the unit of information has been downloaded to the terminal, and (ii) a cost of purchasing a medium recorded with the unit of information. Accordingly, the user can listen to a song to the end at lower cost, and also the user can evaluate a song, which cannot be performed in a short-time audition, at a lower cost than the case where the song is downloaded or the case where the user buys a recording medium recorded with the information.

Preferably, the charge determining unit determines that the terminal is not charged when the playback time or the amount of transmitted information does not reach a predetermined level. With this arrangement, the user is not charged when he or she stops playback after listening to a song for about 10 seconds. Therefore, the user is not charged when he or she listens to a non-favorite song, and thus the user can feel free to try an unknown song. Also, when the user likes a song after listening to the beginning of the song, he or she need not perform a further operation to listen to the song to the end, which is convenient.

The terminal may further include a unit for specifying a genre or an artist of the information; and the server may further include a unit for transmitting to the terminal at least one piece of information corresponding to the specified genre or artist. Accordingly, the user can specify his or her favorite genre, for example, the top 100, instead of a song itself, and thus the user can listen to a currently popular song. In this case, the user is charged based on the playback time, and thus the user can feel free to try a song.

The server may further include a database for storing evaluation data of a preference of a user of the terminal for the information; and a unit for selecting a plurality of pieces of information according to the evaluation data, whereby the transmitting unit transmits at least one of the plurality of pieces of information to the terminal as the at least one piece of information corresponding to the specified genre or artist. With this arrangement, the server can store the user's preference so as to select many of the user's favorite songs at the time of genre playback. Accordingly, the number of operations required by the user, such as skipping songs, can be reduced and the royalties for the information providing program can be increased.

The terminal may further include a unit for requesting from the server information in units of files so as to specify at least one piece of information; and the server may further include a unit for transmitting the information in the units of files to the terminal in response to the request. With this arrangement, if the user registers a song in a favorites file, he or she can play back all of the songs in the favorites file simply by specifying the file. Further, a specific favorite song can be played back by specifying the song in the file. Accordingly, the user need not input or search for a song, and thus the operation by the user can be simplified.

Further, continuous playback and shuffle playback can be performed in the file, and songs can be sorted out or classified when the number of songs in the file increases.

The server may further include a database for storing predetermined information related to the information, the predetermined information being added to the information when the information is transmitted to the terminal; and a unit for transmitting to the terminal the information together with the predetermined information. Accordingly, the latest information about the song can be provided while the song is being played back, and thus convenience for the user is enhanced and sales promotion can be performed.

According to a fourth aspect of the present invention, a system for providing music or video information is provided. The system includes a server; a terminal; a network operable to carry information between the server and the terminal; the server including a unit for sequentially transmitting to the terminal pieces of specific partial information selected in advance from a plurality of pieces of information; and a unit for transmitting to the terminal a desired piece of information selected in the terminal; and the terminal including a unit for playing back the transmitted pieces of specific partial information in real time; and a unit for selecting the desired piece of information from the plurality of pieces of information based on the played back pieces of specific partial information. In the present invention, pieces of specific partial information of music or video information are sequentially transmitted. Thus, by selecting a climax part of a song as well as the beginning of the song, the user can select a favorite song referring to the sequentially transmitted pieces of specific information so as to register the favorite song in his or her favorites file. Accordingly, the user can select and play back a song rapidly the next time, which leads to a significant increase in the user's convenience.

Preferably, the pieces of specific partial information are provided from the server to the terminal free of charge, the terminal may further include a unit for playing back the selected piece of information in real time, and the server may further include a unit for stopping transmission of the selected piece of information to the terminal when the terminal outputs a playback stop instruction while the selected piece of information is being played back; and a charge determining unit operable to determine a charge to the terminal for the selected piece of information based on a factor selected from the group consisting of an amount of the selected piece of information and an amount of time the selected piece of information was played back. Accordingly, the user can sequentially listen to, for example, the climax of songs without worrying about the charge. When the user likes a song, he or she can register the song immediately in his or her file.

BRIEF DESCRIPTION OF THE DRAWINGS

FIG. 3 is a block diagram showing the configuration of a server in the system shown in FIG. 1;

FIG. 4 shows an example of a Web site of the present invention;

FIG. 12 is a flowchart for illustrating a process according to a sixth embodiment of the present invention.

DETAILED DESCRIPTION

Hereinafter, embodiments of the present invention will be described with reference to the drawings.

Figure 1:
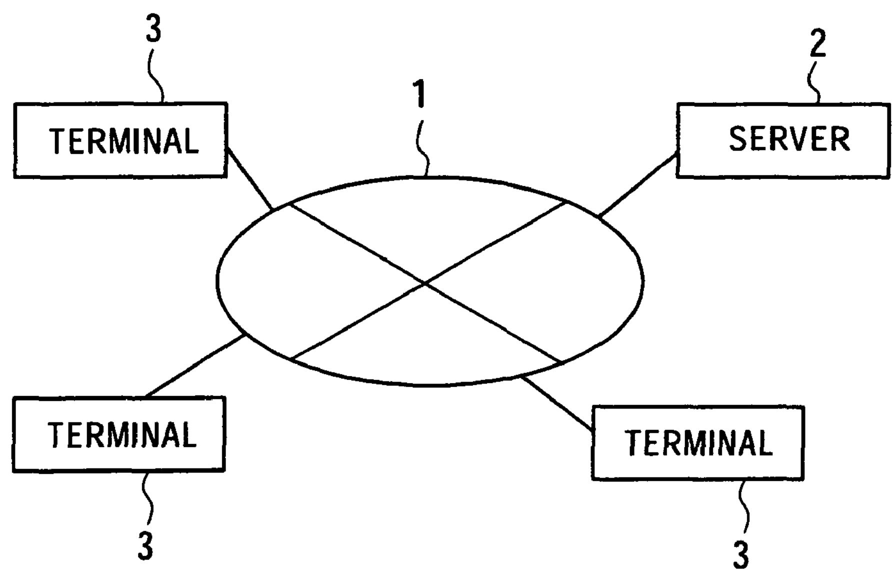
FIG. 1 shows the configuration of a system according to a first embodiment of the present invention.

FIG. 1 shows the configuration of a system according to an embodiment of the present invention.

As shown in FIG. 1, a site-side server 2 and user-side terminals 3 are connected to the Internet 1. The server 2 and the terminals 3 can be formed with, for example, personal computers and necessary software. In this case, song information (files) is provided as specific information from the site side to the user side. However, the specific information may be video, news, etc.

Figure 2:
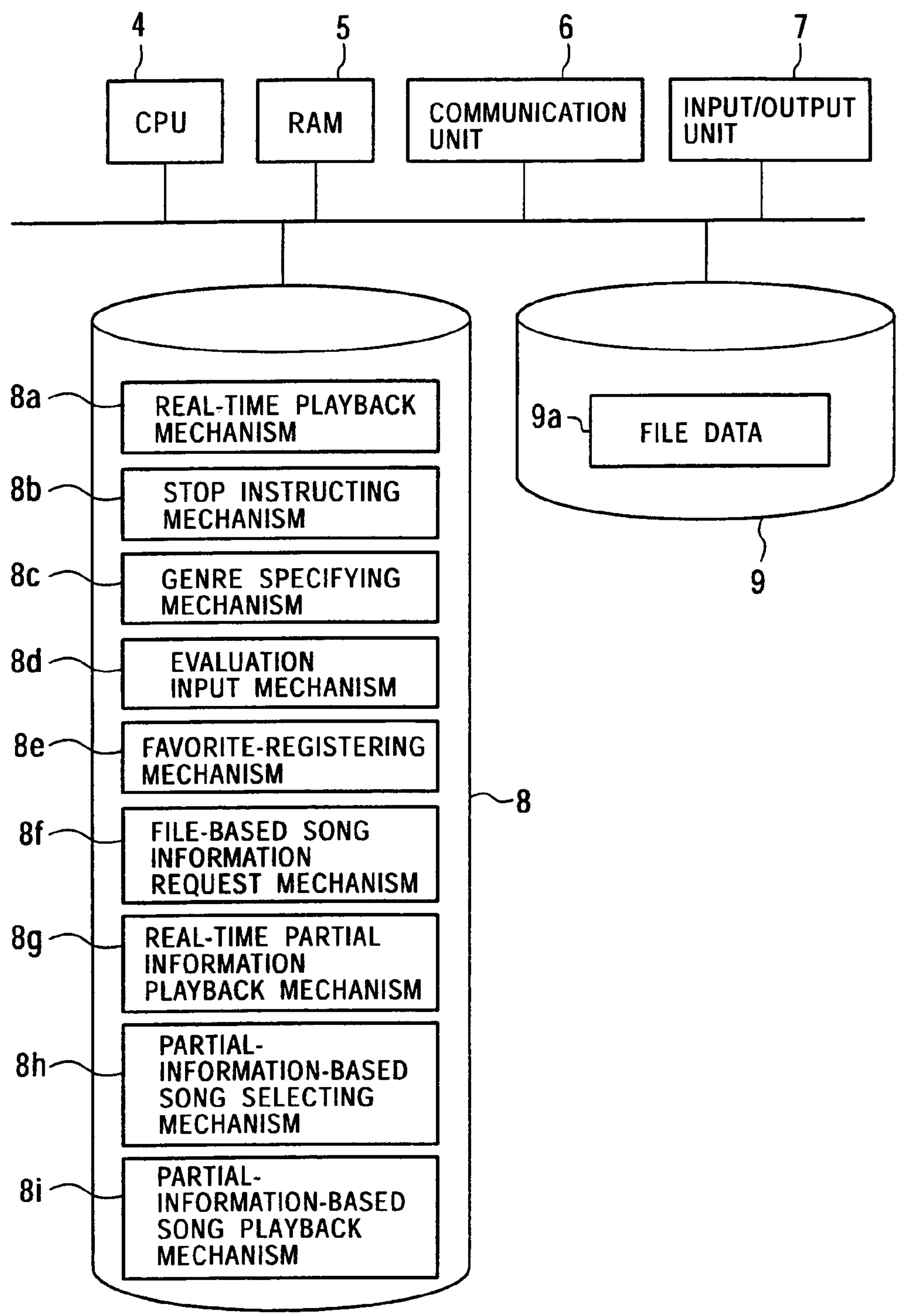
FIG. 2 is a block diagram showing the configuration of a terminal in the system shown in FIG. 1.

FIG. 2 is a block diagram showing the configuration of each of the terminals 3. In this embodiment, a personal computer is used as the terminal 3, but a home audio system, a car stereo, or a portable telephone also may be used.

The terminal 3 includes a CPU 4 and a RAM 5 for performing processing, a communication unit 6 for performing communication through the Internet 1, an input/output unit 7 such as a keyboard, a display, and a speaker, a software storage unit 8 for storing various types of software, and a data storage unit 9 for storing various types of data.

The software storage unit 8 includes a real-time playback mechanism 8*a* for playing back a song transmitted from the server 2 through the Internet 1 in real time (for example, by streaming); a stop instructing mechanism 8*b* for instructing that playback be stopped; a genre specifying mechanism 8*c* for specifying a genre or an artist of a song; an evaluation input mechanism 8*d* for evaluating a song while it is played back; a favorite-registering mechanism 8*e* for registering a favorite song in a favorites file while it is being played back; a file-based song information request mechanism 8*f* for requesting song information in units of files; a real-time partial information playback mechanism 8*g* for playing back partial information of a song transmitted from the server 2 in real time; a partial-information-based song selecting mechanism 8*h* for selecting a desired song based on the played back partial information; and a partial-information-based song playback mechanism 8*i* for playing back the selected song in real time.

The genre specifying mechanism 8*c* is used for specifying an interesting genre (for example, jazz, top 100, and new J-POP). Accordingly, the server 2 transmits an arbitrary song in the genre even when the user does not specify a song.

Further, by registering a favorite song by using the favorite-registering mechanism 8*e*, the user need not input or search for the title of the song.

The file-based song information request mechanism 8*f* may request song information by specifying one or more songs in a file, instead of in units of files.

The data storage unit 9 includes file data 9*a* of registered favorite songs. With this arrangement, the terminal 3 can edit its own favorites file.

Alternatively, the terminal 3 need not include the data storage unit 9; instead, the terminal 3 can register a favorite and edit a file on a Web site provided from the server 2.

For example, a favorites file or the like need not be recorded in the terminal 3, but may be managed on the server 2. If the user has a user ID, the user can find his or her favorites file by using any of the terminals 3 so as to play back a song.

FIG. 3 is a block diagram showing the configuration of the server 2. The server 2 includes a CPU 10 and a RAM 11 for performing processing, a communication unit 12 for performing communication through the Internet 1, an input/output unit 13 such as a keyboard and a display, a software storage unit 14 for storing various types of software, and a data storage unit 15 for storing various types of data.

The software storage unit 14 includes a Web site serving mechanism 14*a* for serving a Web site to the terminal 3 through the Internet 1; a user authentication mechanism 14*b* for authenticating a user ID and password transmitted from the terminal 3; a song transmitting mechanism 14*c* for transmitting a song specified by the user to the terminal 3 through the Internet 1; a transmission stopping mechanism 14*d* for stopping transmission of a song when a stop instruction from the stop instructing mechanism 8*b* of the terminal 3 has been transmitted to the server 2 through the Internet 1; a charge determining mechanism 14*e* for determining the charge based on the playback time or on the amount of information; a genre-based song selecting mechanism 14*f* for selecting a song to be transmitted to the terminal 3 in accordance with a genre or an artist; a genre-based song transmitting mechanism 14*g* for transmitting to the terminal 3 a song of the genre or the artist specified by the genre specifying mechanism 8*c* of the terminal 3; a file-based song transmitting mechanism 14*h* for transmitting a file when the file-based song information request mechanism 8*f* of the terminal 3 requests transmission of songs in units of files; an additional-information-based song transmitting mechanism 14*i* for providing the latest information about a song while it is being played back; a partial information transmitting mechanism 14*j* for transmitting to the terminal 3 through the Internet 1 partial information which has been selected in advance; a partial-information-based song transmitting mechanism 14*k* for transmitting to the terminal 3 through the Internet 1 a song selected by the partial-information-based song selecting mechanism 8*h* of the terminal 3; a partial-information-based transmission stopping mechanism 14*l* for stopping transmission of a song when the terminal 3 instructs that transmission be stopped; and a partial-information-based charge determining mechanism 14*m* for determining the charge based on the playback time or the amount of information of songs according to the partial information.

The transmission stopping mechanism 14*d* does not stop transmitting a song as long as a stop instruction from the stop instructing mechanism 8*b* of the terminal 3 has not been transmitted to the server 2 through the Internet 1, and the song transmitting mechanism 14*c* continues to transmit the song to the end.

The charging method depends on an action of the user after playback has been started. When the user performs no action during playback, the charge determining mechanism 14*e* determines that the user has listened to a song and charges the user accordingly. The charge determining mechanism 14*e* reads how many seconds have passed from the start of playback, and charges the user, for example, ten yen when the entire song has been listened to and does not charge the user when only ten seconds have passed from the start of playback. Also, five yen, for example, is charged when a playback stop instruction is given two minutes after the start of playback, that is, for one chorus.

Accordingly, the user is not charged when he or she listens to music for only a short time. Thus, the user can feel free to listen to a song that he or she cannot recognize only from the title.

In the known art, the user can select free of charge or purchase by downloading. In addition, in the above-described method, the charge when the user stops playback before the end of the song is lower than when the user listens to the entire song. Accordingly, the user can prevent wasteful expenditure and copyright holders can obtain new income.

The user is charged every time he or she listens to music, and thus the user is charged when he or she listens to the same song again.

When the terminal 3 performs an evaluation of a song during playback, the genre-based song selecting mechanism 14*f* in the server 2 records the tastes of the user in a client data file 15*b*, which will be described later, in association with the user ID, so that the genre-based song selecting mechanism 14*f* selects many of the user's favorite songs and few non-favorite songs. Accordingly, the number of operations required by the user, such as skipping, can be reduced and the royalties for the information providing program can be increased.

The user's tastes are determined in the following way. For example, a plurality of songs are played back and some of the songs are stopped by the user within a charge-free time. When 70% of the songs which are stopped early are enka (Japanese ballad), it is determined that the user does not like enka, and when 70% of the songs which are stopped early are jazz, it is determined that the user does not like jazz.

The partial information transmitting mechanism 14*j* selects and transmits part of a song stored in a song data file 15*c*, which will be described later, for example, information for the climax of the song.

The data storage unit 15 includes a basic data file 15*a* for forming a Web site, the client data file 15*b*, the song data file 15*c*, and a related information data file 15*d*. The data in these files is updated as required.

The client data file 15*b* includes data of a favorites file and genre customizing and charge information as well as authentication information such as the name, address, ID, and password of each user in the form of a database.

The song data file 15*c* includes data for genre-classification such as a song ID, the name of an artist, the title, and additional data such as information for defining the climax of the song, as well as data of songs, all in the form of a database.

The related information data file 15*d* includes data such as additional information added to a song, in the form of a database. This data is, for example, the latest information about the song and concert information.

FIG. 4 shows an example of a Web site 16 served by the Web site serving mechanism 14*a*. In FIG. 4, (a) is the top page of the Web site, that is, a user authentication page; (b) is a menu page presented when the user is authenticated; (c) is a page of a program list presented when the user selects program list in the menu page; (d) is a J-POP page presented when the user selects J-POP in the program list page; and (e) is a page for playing back the 10th song presented when the user selects this week's top 10 in the J-POP page.

Also in FIG. 4, (f) is a search page presented when the user selects search in the menu page; (g) is an XYZ page presented when the user inputs the artist XYZ in the search page; and (h) is a playback page when the user selects "I Love You" in the XYZ page.

Further, (i) is a favorites page presented when the user selects favorites in the menu page; (j) is a ballad page presented when the user selects ballads in the favorites page; and (k) is a playback page presented when the user selects all songs in the ballad page. The playback page displays the name of the artist and the title of the song which is being played back.

The user ID and the password can be input to the user authentication page (a) by using the input/output unit 7, for example, a keyboard. Also, by clicking a desired item in each selection page, the page for the selected item is presented.

Further, by clicking a next button 17 or 18 of the XYZ page (g) or the ballad page (j), titles other than the currently presented titles are displayed.

Also, by clicking a forward button 21 in the "this week's top 10" page (e), higher-ranked songs are displayed in a fast-forward manner. By clicking a back button 19, lower-ranked songs are displayed. In addition, by clicking a stop button 20, a playback stop instruction is output by the stop instructing mechanism **8*b* so that transmission is stopped by the transmission stopping mechanism 14*d* of the server 2** to stop playback.

By clicking a stop button 22 or 23 of the playback page (h) or (k), a playback stop instruction is output by the stop instructing mechanism **8*b* so that transmission is stopped by the transmission stopping mechanism 14*d* of the server 2** and playback is stopped.

By clicking a forward button 24 in the playback page (k), the user can skip to the next song.

Also, in each of the playback pages (e), (h), and (k), the latest information about the song can be displayed by the additional-information-based song transmitting mechanism **14*i* in the server 2** so that sales promotion can be performed.

A link to the XYZ page may be displayed in the playback page (e). Accordingly, the number of hits to these pages can be increased.

Figure 5:
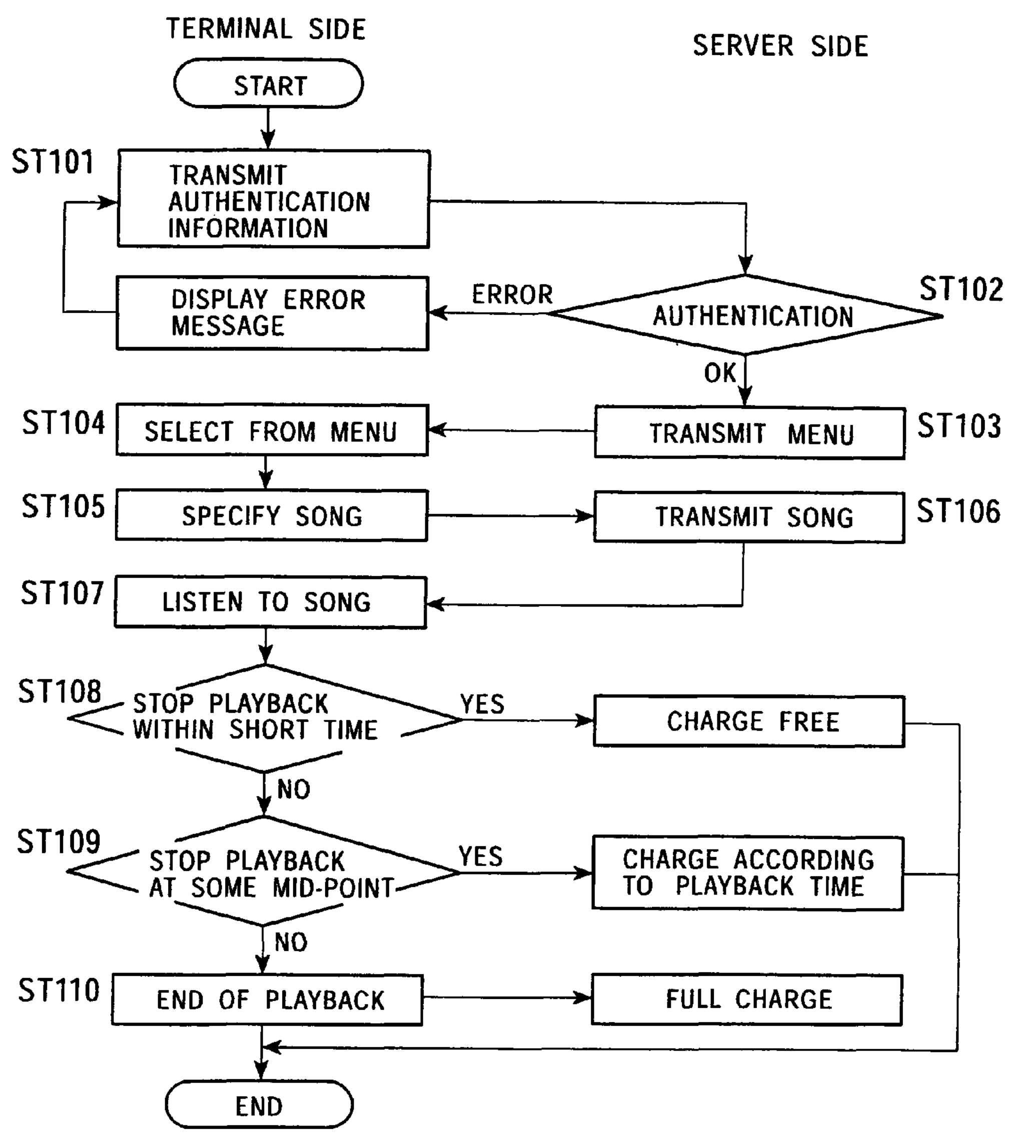
FIG. 5 is a flowchart for illustrating a process according to the first embodiment of the present invention.

Next, the operation of the system configured in this manner will be described with reference to the flowchart in FIG. 5.

For example, when the URL of the Web site 16 is input through the input/output unit 7 by using a predetermined browser in the terminal 3, the server 2 serves the Web site 16 to the terminal 3 through the communication unit 12 and the Internet 1 by using the Web site serving mechanism **14*a***.

Then, as shown in (a) of FIG. 4, necessary information is input in the spaces for the user ID and the password in the Web site 16 by using a keyboard or the like (step 101). This information is transmitted to the server 2 through the Internet 1 and the user authentication mechanism **14*b* authenticates the user (step 102**).

At this time, the user authentication mechanism **14*b* calls up the client data file 15*b* stored in the data storage unit 15** and verifies the input user ID and password.

If the input user ID and password match the client data, the CPU 10 instructs the Web site serving mechanism **14*a* to display the menu page so that the Web site serving mechanism 14*a* displays the menu page shown in (b) of FIG. 4 (step 103**).

If the input user ID and password do not match the client data, a message to that effect is displayed on the terminal 3, and a further input is required in the terminal 3.

Next, the terminal 3 selects an item in the menu page (step 104). For example, by selecting search, the search page shown in (f) of FIG. 4 is displayed, and the user inputs a title so as to specify a song (step 105). Then, this information is transmitted to the CPU 10 in the server 2, and under the control of the CPU 10, the song transmitting mechanism **14*c* reads the specified song from the song data file 15*c* stored in the data storage unit 15 and starts to transmit the song to the terminal 3 through the Internet 1 (step 106**).

Accordingly, by using the real-time playback mechanism **8*a* in the terminal 3, streaming of a desired song can be performed through the speaker of the input/output unit 7 (step 107**).

Various methods can be adopted to specify a song other than the above-described method.

Next, when the stop button 20 in the playback page (e) of FIG. 4 is clicked within a predetermined short time at the terminal 3, that information is transmitted to the transmission stopping mechanism **14*d* in the server 2 through the Internet 1 and the stop instructing mechanism 8*b* in the terminal 3 determines whether the time is within the predetermined time (step 108). If it is determined that the time is within the predetermined time, that information is transmitted to the charge determining mechanism 14*e* in the server 2** and the process is completed without charge.

If the playback is stopped at some mid-point (step 109) after the predetermined short time has passed, that information is transmitted to the charge determining mechanism **14*e* of the server 2 through the Internet 1**, and the user is charged according to the playback time.

Further, when a song is played back to the end, the playback in the terminal 3 ends in accordance with the playback stop by the song transmitting mechanism **14*c* in the server 2 (step 110). In this case, a stop instruction is not output from the terminal 3 during playback, and thus the charge determining mechanism 14*e* charges a full amount which is cheaper than downloading. The charge information is stored, for example, in the client data file 15*b* in the data storage unit 15**.

Accordingly, when the user indicates that he or she does not like a song within a short playback time, the user can stop the song and is not charged. Thus, the user can feel free to listen to an unknown song. Also, when the user wants to stop a song after the predetermined short time has passed, the user can stop it at some mid-point. In this case, the price is lower than the case where the user listens to the song to the end. Thus, the user can feel free to listen to songs. As a result, copyright holders can obtain sufficient income compared to the case of conventional free-of-charge or pay downloads.

The charging method is not limited to the above-described method in which the user is charged in accordance with the playback time. Alternatively, the user may be charged in accordance with the amount of played back information.

As described above, according to the first embodiment, since a song or video information is played back in real time in the terminal 3 without downloading it, restrictions on the hardware of the terminal 3 are reduced and a large amount of music can be listened to anytime and anywhere. Also, the user can listen to music more cheaply compared to the case of downloading it, and copyright problems are reduced.

Also, the terminal 3 side is charged based on the playback time or the amount of played back information. Thus, when the user stops playback because he or she does not like the song, the price is lower than the case where the user listens to the song to the end. Accordingly, the user can feel free to listen to music.

Further, since the user is not charged when he or she stops playback after listening to a song for about 10 seconds, the user is not charged when he or she does not like the played back music. Thus, the user can feel free to listen to unknown songs. Also, if the user likes a song being played back, he or she can continue to listen to the song to the end, which is convenient.

Also, in the conventional art of free or pay downloads, copyright holders cannot obtain sufficient income. However, with the introduction of a charging method based on the playback time and so on, further profit can be expected.

Figure 6:
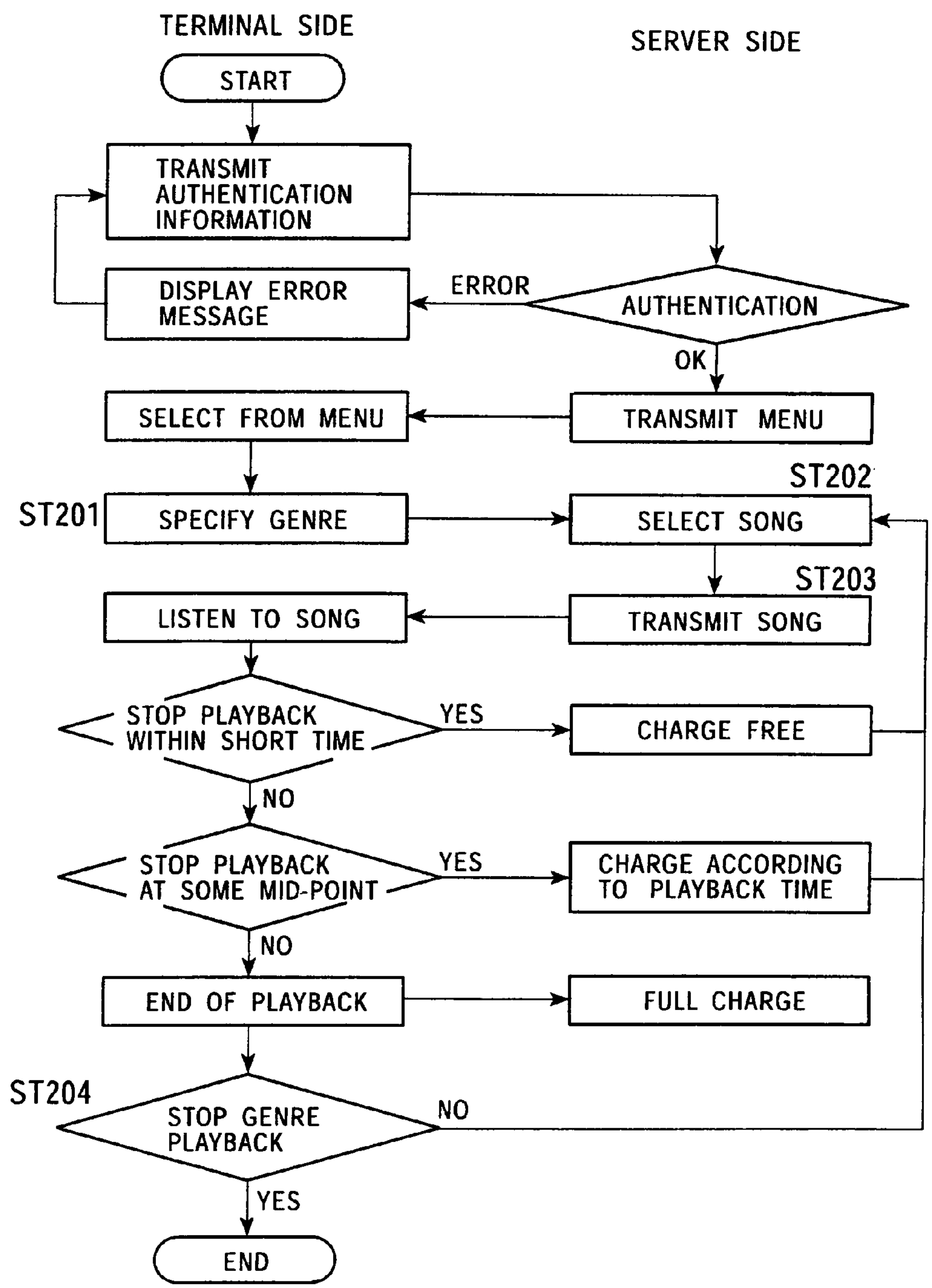
FIG. 6 is a flowchart for illustrating a process according to a second embodiment of the present invention.

Next, a second embodiment of the present invention will be described. FIG. 6 is a flowchart illustrating the process according to the second embodiment. The configuration of a system according to the second embodiment is the same as in the first embodiment, and the corresponding description will be omitted.

Now, the operation in the second embodiment will be described. From the step in which the URL of the Web site 16 is input through the input/output unit 7 by using the predetermined browser in the terminal 3 to the step in which the menu page shown in (b) of FIG. 4 is displayed in the terminal 3 is the same as in the first embodiment, and thus the corresponding description will be omitted.

Referring to FIGS. 2, 3, and 6, when the terminal 3 side selects program list in the menu page presented to the terminal 3, the program list shown in (c) of FIG. 4 is displayed. Then, when the terminal 3 side selects J-POP and the genre specifying mechanism 8*c* in the terminal 3 selects "this week's top 10" in the J-POP page (d) of FIG. 4 (step 201), the genre-based song selecting mechanism 14*f* selects the 10th song "I Love You" from the song data file 15*c* stored in the data storage unit 15 in the server 2 (step 202), and then the genre-based song transmitting mechanism 14*g* starts to transmit the 10th song as shown in (e) of FIG. 4 (step 203).

As in the first embodiment, when the terminal 3 side clicks the stop button 20 in the playback page (e) of FIG. 4 within the predetermined short time, the user is not charged. Also, when the terminal 3 side stops playback at some mid-point after the predetermined short time has passed, the user is charged according to the playback time. If the user listens to a song to the end, the user is charged the full amount.

However, in the second embodiment, a playback stop instruction is transmitted to the genre-based song selecting mechanism 14*f* as well as to the transmission stopping mechanism 14*d*. By receiving the instruction, the genre-based song selecting mechanism 14*f* selects the next song, for example the ninth song, from the song data file 15*c*. Then, the genre-based song transmitting mechanism 14*g* transmits the ninth song to the terminal 3 through the Internet 1.

When the 10th song is played back to the end, for example, the stop button 20 in the playback page (e) of FIG. 4 is clicked and it is determined whether real-time playback of songs in the genre "this week's top 10" is stopped (step 204). If real-time playback of the songs in the genre is stopped, the charge information is stored in the client data file 15*b*.

Further, when the stop button 20 in the playback page (e) of FIG. 4 is not clicked and when real-time playback of the songs in the genre "this week's top 10" is not stopped, the next song, for example, the ninth song is played back.

As described above, according to the second embodiment, since the terminal 3 side can specify a genre or an artist instead of a song itself, an interesting song can be played back in real time even if the user does not have information such as the title of the song. In addition, the user is not charged if he or she stops playback within the predetermined short time, and thus the user can feel free to listen to the songs.

Also, when the terminal side 3 specifies a genre or an artist, the server 2 can select and transmit a plurality of arbitrary songs. Therefore, the user need not repeatedly search for songs, which is inconvenient.

Figure 7:
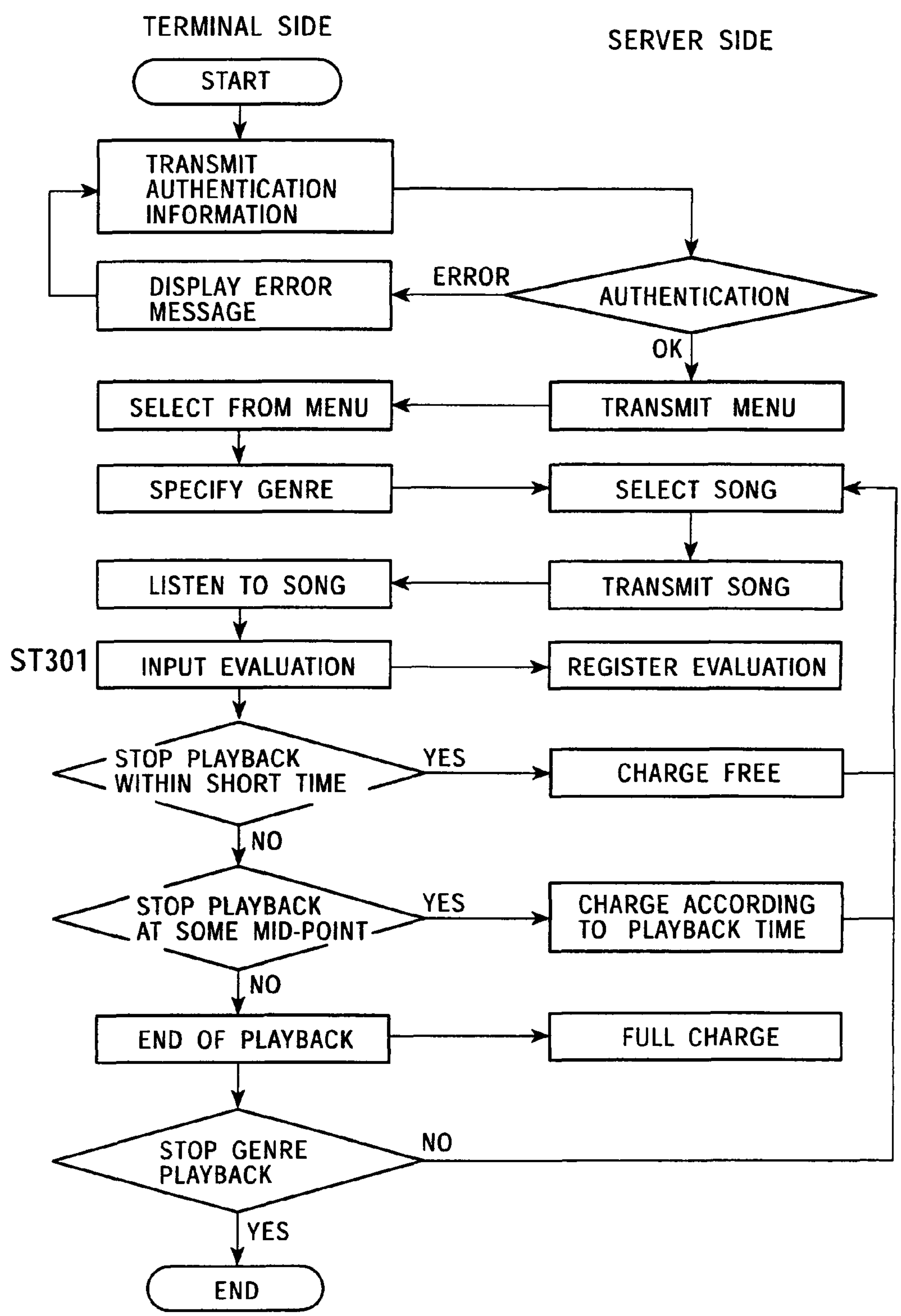
FIG. 7 is a flowchart for illustrating a process of inputting an evaluation by specifying a genre.
Figure 8:
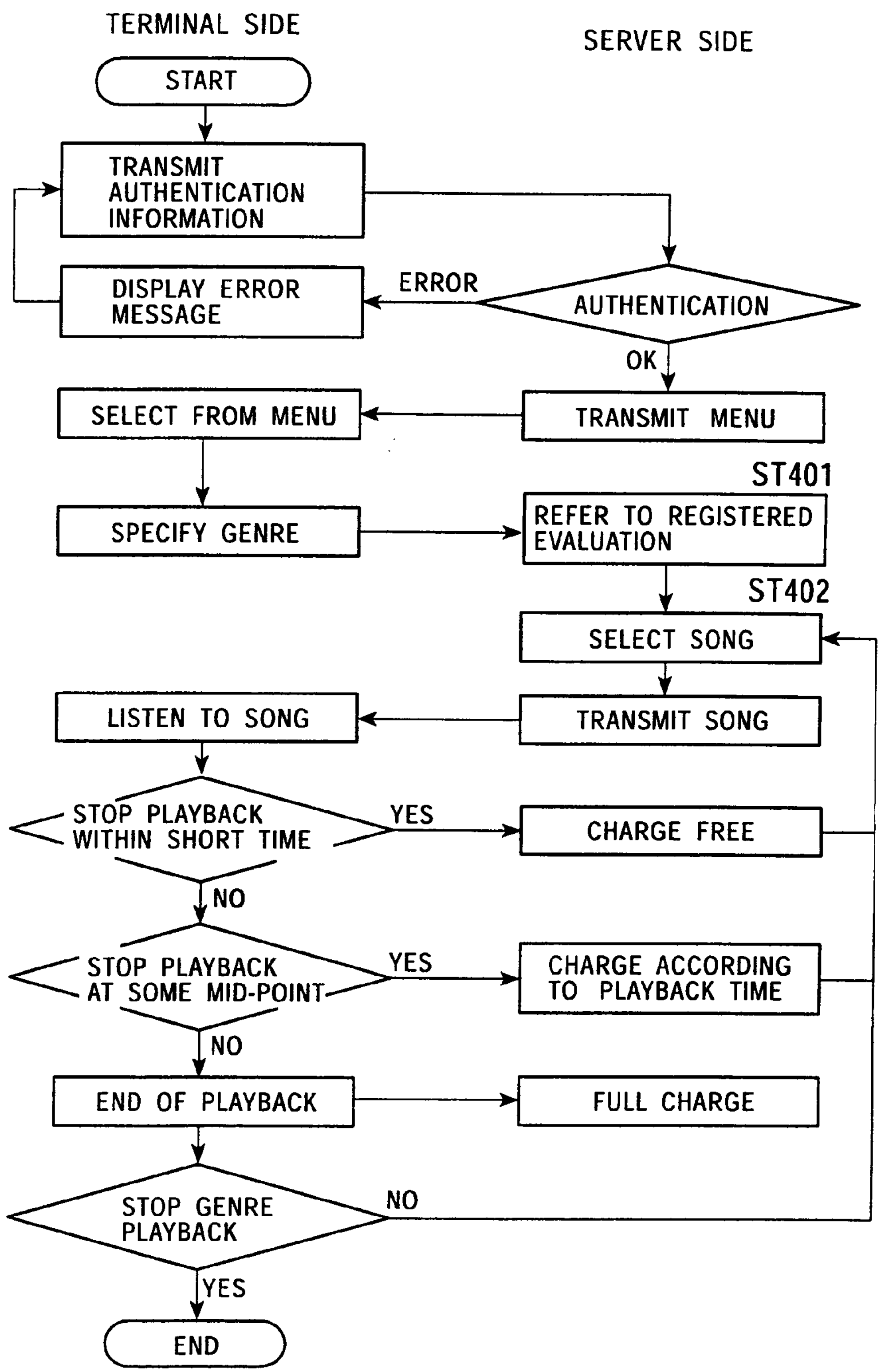
FIG. 8 is a flowchart for illustrating a process according to a third embodiment of the present invention.

Next, a third embodiment of the present invention will be described. FIG. 7 is a flowchart of a process of inputting an evaluation when a genre is specified. FIG. 8 is a flowchart of a process according to the third embodiment of the present invention. The configuration of a system according to the third embodiment is the same as in the first embodiment, and thus the corresponding description will be omitted.

For example, as shown in FIG. 7, if a song being played back is evaluated (step 301) by using the evaluation input mechanism 8*d* in the terminal 3 shown in FIG. 2 while a genre-based playback is being performed, the evaluation data is stored as the user's tastes in the client data file 15*b* of the data storage unit 15, the data being related to the user ID in the server 2 through the Internet 1.

Next, the operation in the third embodiment will be described. From the step in which the URL of the Web site 16 is input through the input/output unit 7 by using the predetermined browser in the terminal 3 to the step in which the menu page shown in (b) of FIG. 4 is displayed in the terminal 3 is the same as in the first embodiment, and thus the corresponding description will be omitted.

Referring to FIGS. 2, 3, and 8, when the genre specifying mechanism 8*c* specifies a genre, the genre-based song selecting mechanism 14*f* in the server 2 selects a song to be played back in real time from the song data file 15*c*. Herein, the genre-based song selecting mechanism 14*f* reads data of the user's tastes from the client data file 15*b* (step 401) and selects many of the user's favorite songs and few non-favorite songs (step 402).

After the genre-based song selecting mechanism 14*f* selects a favorite song, the same steps as in the second embodiment are performed to the step of stopping genre playback, and thus the corresponding description will be omitted.

According to the third embodiment, a song is evaluated while it is being played back so that many favorite songs may be selected based on the evaluation when a genre-based selection is performed. Therefore, the number of operations required by the user, such as skipping, can be reduced and the royalties for the information providing program can be increased.

Figure 9:
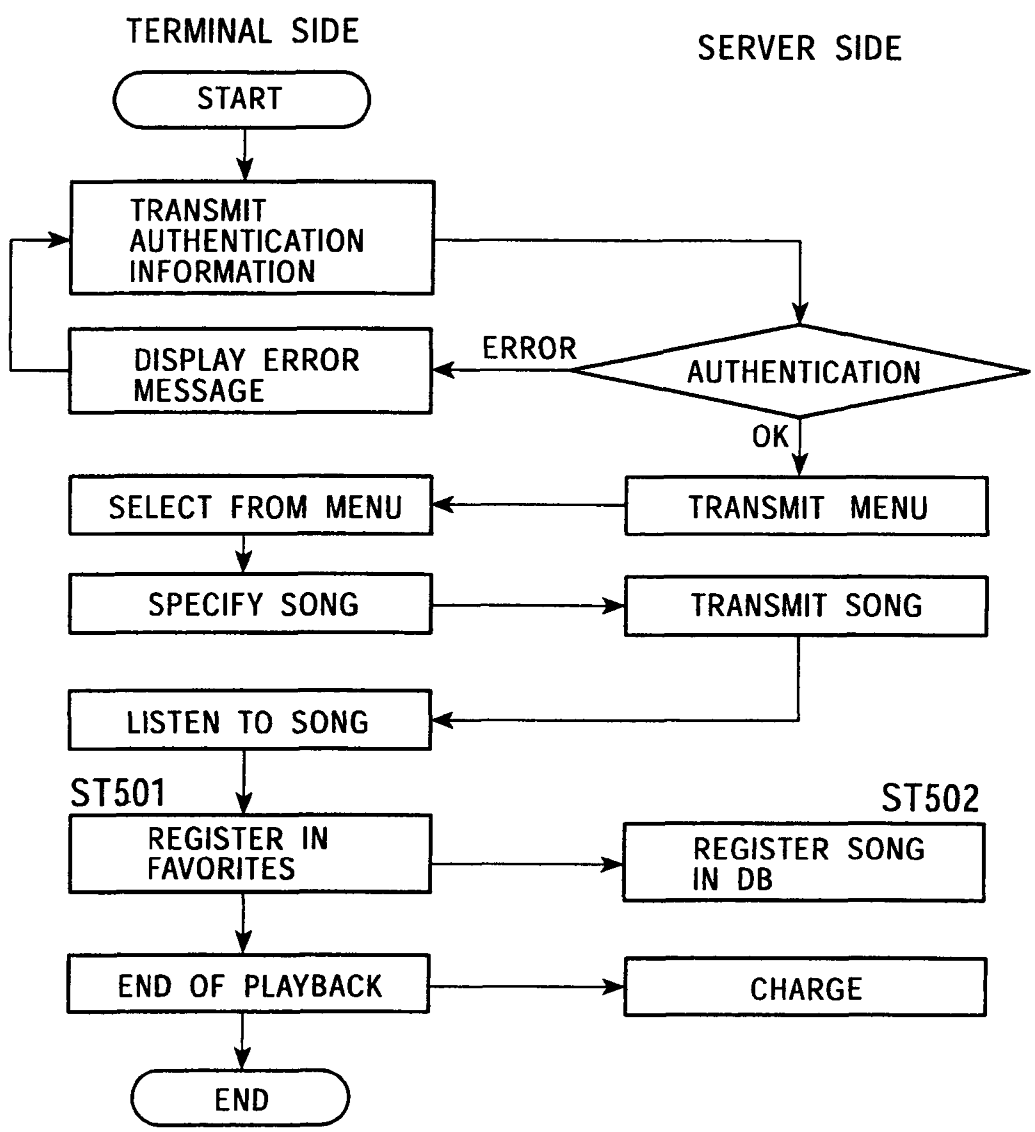
FIG. 9 is a flowchart for illustrating a process of registering a song in a favorites file while the song is being played back.
Figure 10:
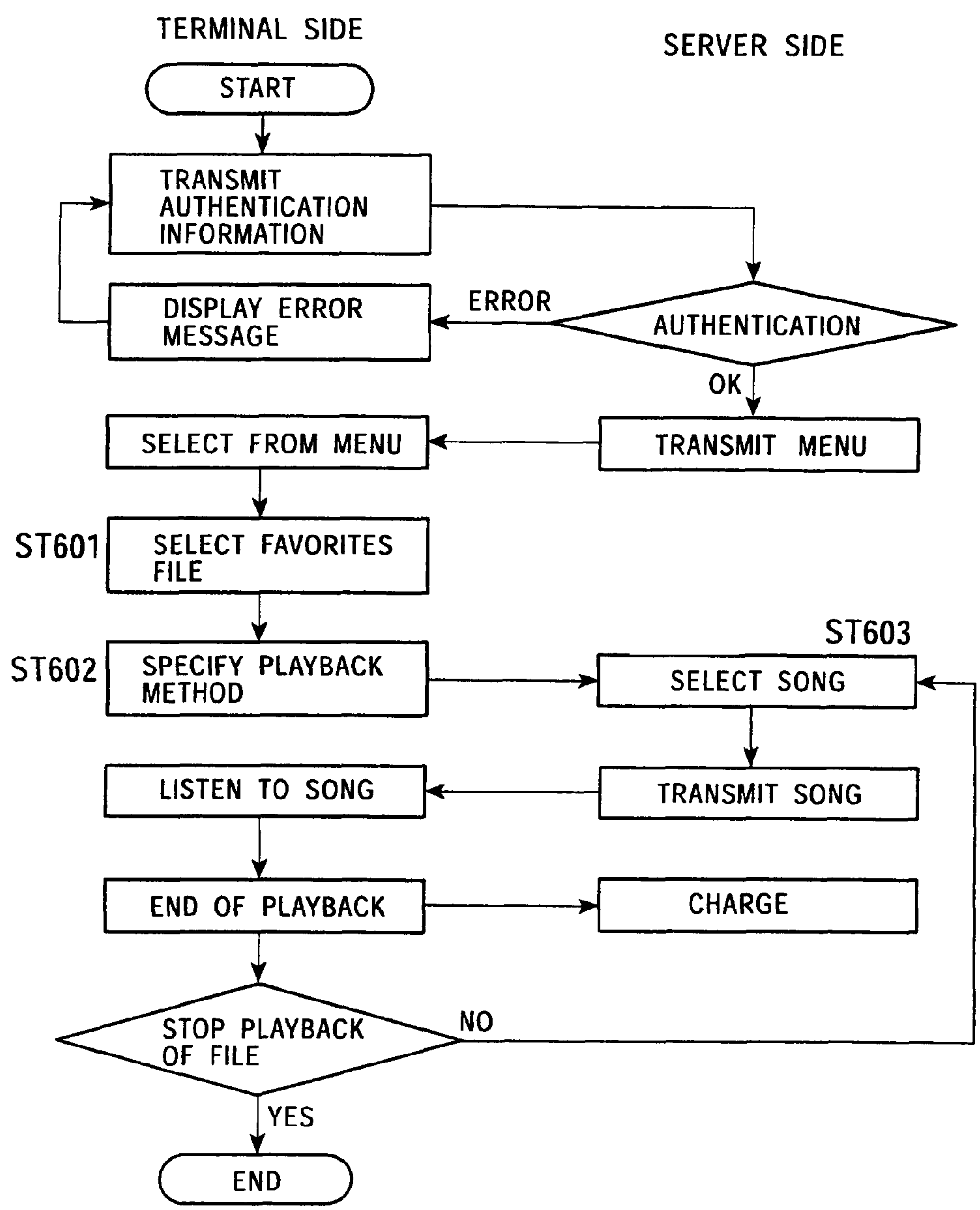
FIG. 10 is a flowchart for illustrating a process of playing back a song in the favorites file in real time.

Next, a fourth embodiment of the present invention will be described. FIG. 9 is a flowchart of a process of registering a song in the favorites file while the song is being played back. FIG. 10 is a flowchart of a process of playing back a song in the favorites file in real time according to the fourth embodiment of the present invention.

Referring to FIG. 9, by clicking "register in favorites" in the playback page (h) of FIG. 4 while a song is being played back, the favorite-registering mechanism 8*e* in the terminal 3 registers the song in the file data 9*a* so as to store the song (step 501). At the same time, the title and so on of the song is registered and stored in the client data file 15*b* in the server 2 as favorites (step 502).

The configuration of a system according to the fourth embodiment is the same as in the first embodiment, and thus the corresponding description will be omitted.

Next, the operation in the fourth embodiment will be described. From the step in which the URL of the Web site 16 is input through the input/output unit 7 by using the predetermined browser in the terminal 3 to the step in which the menu page is displayed in the terminal 3 is the same as in the first embodiment, and thus the corresponding description will be omitted.

Referring to FIGS. 2, 3, and 10, when the file-based song information request mechanism 8*f* in the terminal 3 selects favorites in the menu page (step 601), the favorites page is displayed, and by selecting ballad, the ballad page shown in (j) of FIG. 4 is displayed.

By specifying a playback method (step 602), for example, by selecting playback all songs, the file-based song transmitting mechanism 14*h* in the server 2 selects a predetermined song from the song data file 15*c* (step 603), and the selected song is transmitted to the terminal 3 through the Internet 1.

Then, after a real-time playback of a first song, the charge is determined by the charge determining mechanism 14*e* and that information is stored in the client data file 15*b* as data.

Also, except for the case where playback of a file is stopped by the stop instructing mechanism 8*b*, the process returns to step 603 so that another predetermined song is selected from the song data file 15*c* (step 603), and the selected song is transmitted to the terminal 3 through the Internet 1.

Furthermore, when playback of a file is stopped by the stop instructing mechanism 8*b*, a playback stop instruction is transmitted to the transmission stopping mechanism 14*d* in the server 2 by clicking the stop button 23 in the playback page (k) of FIG. 4, and thus playback of the file is stopped.

According to the fourth embodiment, favorite songs can be registered in the favorites file while listening to the songs, and when the user wants to listen to all the favorite songs, the songs can be played back simply by opening the favorites file and clicking "playback all songs". Accordingly, the user need not search for and input each favorite song, and the user's operation can be significantly reduced.

Also, by changing the playback method, only one specific song in a file can be played back. Further, the file data 9*a* can be freely sorted out and edited in the terminal 3 side. Thus, the user can transmit the edited file data to the server 2 through the Internet 1 so that the file data can be stored in the client data file 15*b*.

Alternatively, the terminal 3 need not include the data storage unit 9 for the file data 9*a*, and the data may be edited, processed, and stored in the server 2. Also, a song is not downloaded to the file data 9*a* which stores only information such as the title of the song and the name of the artist.

Accordingly, there are less restrictions in the hardware in the terminal 3, and the user can play back his or her favorite songs anywhere by using a terminal in which his or her user ID is input. Also, since a song is not downloaded, copyright problems are reduced.

Figure 11:
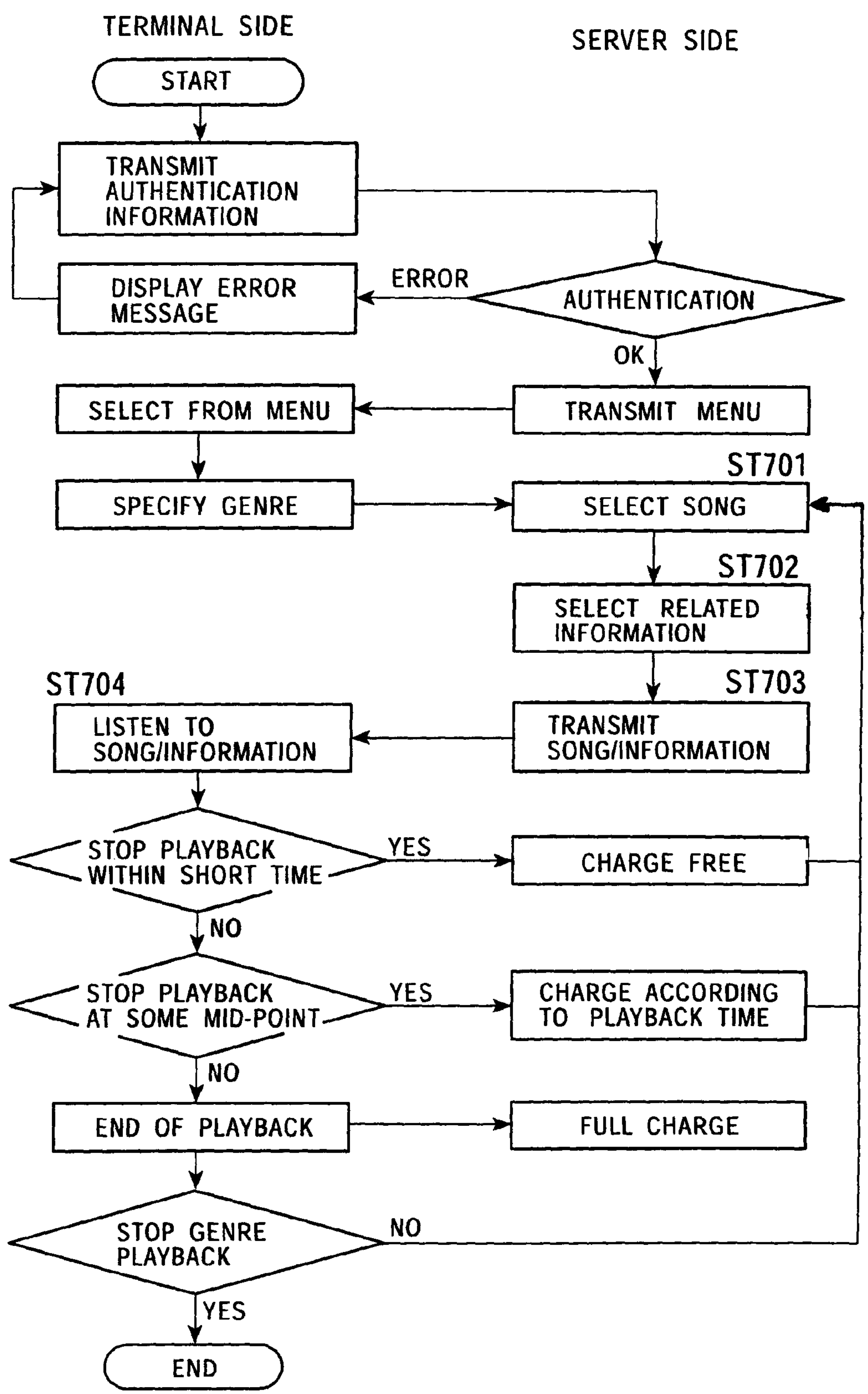
FIG. 11 is a flowchart for illustrating a process according to a fifth embodiment of the present invention.

Next, a fifth embodiment of the present invention will be described. FIG. 11 is a flowchart of a process according to the fifth embodiment. The configuration of a system according to the fifth embodiment is the same as in the first embodiment, and the thus the corresponding description will be omitted.

Next, the operation of the fifth embodiment will be described. From the step in which the URL of the Web site 16 is input through the input/output unit 7 by using the predetermined browser in the terminal 3 to the step in which the genre-based song selecting mechanism 14*f* selects a predetermined song from the song data file 15*c* stored in the data storage unit 15 in the server 2 is the same as in the second embodiment, and thus the corresponding description will be omitted.

Referring to FIGS. 3 and 11, when a song is selected (step 701), the additional-information-based song transmitting mechanism 14*i* selects information related to the song to be played back in the form of characters and videos from the related information data file 15*d* stored in the data storage unit 15 (step 702), and the related information is transmitted to the terminal 3 through the Internet 1 together with the song (step 703). Accordingly, the song and the additional information are played back in the terminal 3 side (step 704).

After that, the same steps as in the second embodiment are performed, except that additional information is played back together with each song.

According to the fifth embodiment, additional information can be provided while a song is being played back, and thus the user can obtain useful information and sales promotions can be performed.

Also, the information is not downloaded to the terminal 3, and thus a large volume of information such as video information can be provided without keeping the user waiting.

Next, a sixth embodiment of the present invention will be described. FIG. 12 is a flowchart of a process according to the sixth embodiment. The configuration of a system according to the sixth embodiment is the same as in the first embodiment, and thus the corresponding description will be omitted.

Next, the operation according to the sixth embodiment will be described. From the step in which the URL of the Web site 16 is input through the input/output unit 7 by using the predetermined browser in the terminal 3 to the step in which the menu page is displayed in the terminal 3 is the same as in the first embodiment, and thus the corresponding description will be omitted.

Referring to FIGS. 2, 3, and 12, by clicking "others" in the menu page (b) of FIG. 4 so as to specify genre-specific partial information (step 801), the partial information transmitting mechanism 14*j* of the server 2 selects predetermined partial information, for example, the climax of a song from the song data file 15*c* (step 802), and the selected information is transmitted to the terminal 3 through the Internet 1 so as to be played back by the real-time partial information playback mechanism 8*g*.

Then, when the stop button in the playback page is clicked after the partial information of a song is played back so that playback of the partial information is stopped (step 803), and when the partial-information-based song selecting mechanism 8*h* specifies a song of desired partial information (step 804), the corresponding song is selected from the song data file 15*c* in the server 2, and the selected song is transmitted to the terminal 3 through the Internet 1 by the partial-information-based song transmitting mechanism 14*k*, and thus a desired song is played back by the partial-information-based song playback mechanism 8*i* in the terminal 3. Incidentally, the user is not charged when he or she plays back partial information itself. Accordingly, the user can feel free to listen to partial information.

Also, when playback of partial information is not stopped at step 803, the process returns to step 802 and predetermined partial information is selected so as to transmit the next partial information, and the selected information is transmitted to the terminal 3.

Furthermore, when a song is not specified at step 804, it is determined that the user does not want to listen to partial information and a song, and playback ends.

When a song is specified at step 804 and when a playback stop instruction is output during playback (step 805), for example, when the stop button in the playback page is clicked, the partial-information-based transmission stopping mechanism 14*l* in the server 2 stops playback, the partial-information-based charge determining mechanism 14*m* determines the charge according to the playback time, and the charge information is stored in the client data file 15*b*.

Further, when the song is played back to the end (step 806), the partial-information-based transmission stopping mechanism 14*l* in the server 2 transmits information that the song has been fully played back to the partial-information-based charge determining mechanism 14*m*, which determines the full charge, and the charge information is stored in the client data file 15*b*.

According to the sixth embodiment, partial information of a plurality of songs can be continuously played back in real time and free of charge. In this method, the user can evaluate a song more adequately than in the case where the user listens to free information of the climax of the song so as to fully play back the song, and thus wasteful listening can be prevented. Also, if the user does not click the stop button, partial information of a plurality of songs can be continuously listened to. Thus, the user need not operate pages for each song and the burden on the user can be reduced.

Also, when the user listens to partial information and specifies a song so as to start listening to the song, and when the user wants to stop playback at some mid-point, the user is charged according to the playback time if he or she stops playback. Thus, the user can feel free to play back songs. Also, in the method where the user is charged according to playback time based on the partial information, copyright holders can obtain more income than in the case of conventional free or pay downloading.

As described above, according to the present invention, the user can have broader options. That is, with the conventional method, the user selects a charge-free audition or promotion (in many cases, time is limited and it is not on-demand), or purchases with a charge. In addition, according to the present invention, the user can try a song at a low price, and buy the song if he or she likes the song (if the user thinks it is more economical to buy the song because he or she wants to listen to the song many times), by using the service according to the present invention.

The service providers can expect income by the promotion, and it becomes possible to ensure income by attracting users who have been reluctant to purchase songs (users who do not bring income). Also, a promotion for a song can be performed while the song is being played back, and thus a good promotional effect can be achieved. For example, the latest concert information may be provided.

Further, those who are in the business of selling CD packages can coexist with the service providers so as to obtain co-prosperity by using segregation (for example, songs included in only an album are not transmitted).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

For example, in the above-described embodiments, the charging method is based on the playback time or the amount of information. However, the user may be charged according to the contents of the played back information. For example, the latest information may be more expensive. Accordingly, various charging methods can be adopted and income for copyright holders can be further increased.

Further, in the above-described embodiments, partial information of a plurality of songs is selected from the song data file 15*c* and is transmitted as partial information. Alternatively, information about the climax of a song may be prepared in advance independently from the data of the songs, and the information about the climax may be transmitted as partial information.

As described above, in the present invention, real-time playback of music or video can be enjoyed on a network easily and at a low price. Further, income of copyright holders can be increased.

The invention claimed is:

1. A method for providing music information from a server to a terminal through a network, the method comprising:

specifying a genre or artist of music information in the terminal;

transmitting from the server to the terminal music information selected according to the specified genre or artist;

receiving the transmitted music information from the server at the terminal;

playing back the received music information in real time in the terminal;

determining a charge to the terminal for playing back the music information based on an amount of time the music information was played back from start thereof or based on an amount of information which was played back such that (i) if the amount of time is less than a first predetermined amount of time or if the amount of information is less than a first predetermined amount of information the charge is free, (ii) if the amount of time is more than the first predetermined amount of time and less than a total time which corresponds to a time to play back the music information in its entirety the charge is determined based on an actual amount of time the music information was played back or if the amount of information is more than the first predetermined amount of information and less than a total amount of information which corresponds to the music information in its entirety the charge is determined based on an actual amount of information played back, and (iii) if the amount of time is the total time or if the amount of information is the total amount of information the charge is a full amount; and evaluating the music information representative of each of a plurality of songs during playback to determine which genre a user does not like, in which the evaluating involves determining whether a respective genre is associated with 70% or more of all songs wherein (i) the amount of time the music information of each song which was played back from start thereof is less than the first predetermined amount of time or (ii) the amount of information of each song which was played back is less than the first predetermined amount of information, and when 70% or more of said all songs are determined to be associated with said respective genre determining that the user does not like the respective genre.

2. The method according to claim 1, further comprising utilizing the specified genre or artist and a result of the evaluating of the music information to select the music information to be transmitted to the terminal by the server.

3. A system for providing music information, comprising:

means for specifying a genre or artist of music information at a terminal;

means for transmitting from a server to the terminal music information selected according to the specified genre or artist;

means for receiving the transmitted music information from the server at the terminal;

means for playing back the received music information in real time at the terminal;

means for determining a charge to the terminal for playing back the music information based on an amount of time the music information was played back from start thereof or based on an amount of information which was played back such that (i) if the amount of time is less than a first predetermined amount of time or if the amount of information is less than a first predetermined amount of information the charge is free, (ii) if the amount of time is more than the first predetermined amount of time and less than a total time which corresponds to a time to play back the music information in its entirety the charge is determined based on an actual amount of time the music information was played back or if the amount of information is more than the first predetermined amount of information and less than a total amount of information which corresponds to the music information in its entirety the charge is determined based on an actual amount of information played back, and (iii) if the amount of time is the total time or if the amount of information is the total amount of information the charge is a full amount; and evaluating means for evaluating the music information representative of each of a plurality of songs during playback to determine which genre a user does not like, in which the evaluating involves determining whether a respective genre is associated with 70% or more of all songs wherein (i) the amount of time the music information of each song which was played back from start thereof is less than the first predetermined amount of time or (ii) the amount of information of each song which was played back is less than the first predetermined amount of information, and when 70% or more of said all songs are determined to be associated with said respective genre determining that the user does not like the respective genre.

4. The system according to claim 3, further comprising means for utilizing the specified genre or artist and a result of the evaluating of the music information to select the music information to be transmitted to the terminal by the server.

* * * * *